United States Patent
Tully-Hanson

(10) Patent No.: US 11,911,695 B1
(45) Date of Patent: Feb. 27, 2024

(54) DEVICE FOR CONVERTING INPUT FROM CONTROL DEVICES

(71) Applicant: Amazon Technologies, Inc., Seattle, WA (US)

(72) Inventor: Benjamin Tully-Hanson, Irvine, CA (US)

(73) Assignee: Amazon Technologies, Inc., Seattle, WA (US)

( * ) Notice: Subject to any disclaimer, the term of this patent is extended or adjusted under 35 U.S.C. 154(b) by 258 days.

(21) Appl. No.: 16/750,927

(22) Filed: Jan. 23, 2020

(51) Int. Cl.
*A63F 13/42* (2014.01)
*H04L 67/125* (2022.01)

(52) U.S. Cl.
CPC ............ *A63F 13/42* (2014.09); *H04L 67/125* (2013.01)

(58) Field of Classification Search
CPC ............................. A63F 13/42; H04L 67/125
See application file for complete search history.

(56) References Cited

U.S. PATENT DOCUMENTS

| | | | |
|---|---|---|---|
| 2011/0021269 A1* | 1/2011 | Wolff-Peterson | A63F 13/85 463/29 |
| 2015/0231498 A1* | 8/2015 | Hain | A63F 13/42 463/36 |
| 2016/0317925 A1* | 11/2016 | Miller | A63F 13/98 |
| 2018/0056180 A1* | 3/2018 | Russell | A63F 13/42 |
| 2021/0109606 A1* | 4/2021 | Erivantcev | G06F 3/038 |
| 2021/0281495 A1* | 9/2021 | Mezghani | H04L 41/5006 |

* cited by examiner

*Primary Examiner* — Yingchuan Zhang
(74) *Attorney, Agent, or Firm* — Lee & Hayes, P.C.

(57) ABSTRACT

This disclosure describes, in part, an electronic device for converting inputs received by control devices. For instance, a user may attach the electronic device to a control device. The electronic device may then configure the control device with a network application by associating various input devices of the control device with controls of the network application. After configuring the control device, the electronic device may receive input data representing inputs received by the control device. Using the associations, the electronic device may generate control data representing the controls that are associated with the inputs. The electronic device may then send the control data to a remote system, which may use the control data to update a state of the network application. The electronic device may perform similar processes in order to allow the user to use different types of control devices to control the network application.

19 Claims, 10 Drawing Sheets

DEVICE FOR CONVERTING INPUT FROM CONTROL DEVICES

BACKGROUND

As gaming has become popular, companies have created electronic devices, such as video game consoles, that allow users to play various types of games. For example, a video game console, connected to a television, may cause the television to display content related to a state of a game. While the television is displaying the content, the video game console may receive inputs directly from a video game controller in possession of a user. The video game console may then process the inputs in order to update the state of the game. Based on the updates, the video game console may cause the television to display content related to the updated state of the game.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
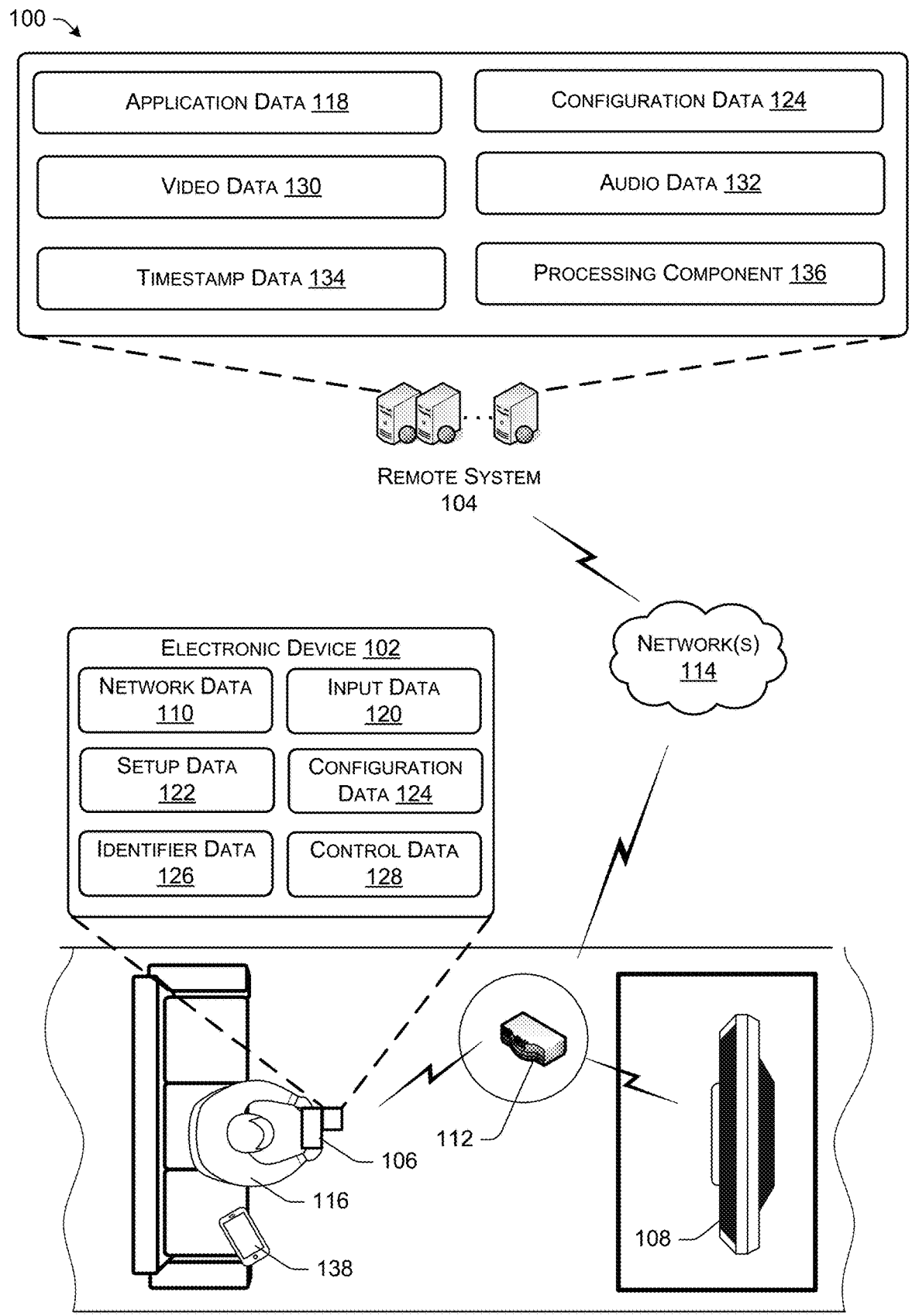
FIG. 1 illustrates a schematic diagram of an example system for controlling network applications using an electronic device connected to a control device, according to various aspects of the present disclosure.

This disclosure describes, in part, an electronic device for converting inputs from various control devices. For instance, a user may control an application executing on a remote system using a control device that communicates with a remote system via a network connection. For instance, the control device may send data to the remote system, where the data represents at least inputs received by the control device. The remote system may then update a current state of the network application using the data received from the control device. Additionally, the remote system may send, via the network connection, video data to a display device, where the video data represents the current state of the network application. As such, and in some instances, an additional electronic device, such as a video game console, may not be required to execute the network application and/or process the data from the control device. In such examples, this may remove the need of the additional electronic device.

In some instances, the user may want to use different types of control devices to control the network application. For example, if the network application includes a gaming application, the control devices may include, but are not limited to, an XBOX® game controller, a PLAYSTATION® game controller, a NINTENDO® game controller, and/or any other type of game controller. However, since the different types of game controllers may include different types of input devices, one or more of the game controllers may not be compatible and/or configured for the gaming application. This may cause it so that the user is not able to use one or more of the game controllers with the network game.

As such, the application describes an electronic device that is able to configure different types of control devices so that the control devices are compatible for network applications. For example, the user may connect the electronic device to a control device. In some instances, the electronic device includes a wired connector, such as a Universal Serial Bus (USB), cable, and/or other types of connector, that the electronic device uses to establish a wired connection with the control device. Additionally, or alternatively, in some instances, the electronic device includes a network interface that the electronic device uses to establish a wireless connection with the control device. The wireless connection may include, but is not limited to, a Bluetooth connection, a Zigbee connection, and/or any other type of wireless connection.

The electronic device may also establish a connection with a network device, such as an access point. In some instances, the electronic device includes a wired connector, such a USB, cable, and/or other types of connector, that the electronic device uses to establish a wired connection with the network device. Additionally, or alternatively, in some instances, the electronic device includes a network interface that the electronic device uses to establish a wireless connection (e.g., Internet connection) with the network device. In either instance, the electronic device may use network data representing configuration settings, such as a Service Set Identifier (SSID) and password, to establish the connection with the network device.

In some instances, such as when the electronic device has yet to be configured, the electronic device may receive the network data representing the configuration settings. For example, the user may use the control device and/or another device (e.g., a mobile phone) to input the configuration settings, and the device may then send the network data to the electronic device. The electronic device may then use the configuration settings to establish the connection with the network device. In other instances, such as when the electronic device has previously been configured, the electronic device may already store the network data representing the configuration settings. As such, the electronic device may use the configuration settings to establish the connection with the network device.

The electronic device may then be configured for the control device and/or the network application. For example, the control device may be configured for use with multiple network applications. For instance, the electronic device may receive, from the remote system, data representing general controls that are applicable to more than one network application. For example, a first control may be associated with a joystick, a second control may be associated with a first type of button (e.g., the "X-button"), a third control may be associated with a second type of button (e.g., the "Y-button"), and/or the like. The control device, the electronic device, and/or the display device may then request that the user associate input devices of the control device with the various general controls.

For example, the display device may present content associated with a first control, such as "left joystick". The control device may then receive an input selecting a first input device and send data representing the input to the electronic device. The electronic device may then associate the selected input device (e.g., the first input device) with the first control (e.g., the left joystick). For another example, the display device may present content associated with a second control, such as the "X-button". The control device may then receive an input selecting a second input device and send data representing the input to the electronic device. The electronic device may then associate the selected input device (e.g., the second input device) with the second control (e.g., the X-button). This process may then be repeated for the other general controls. In some instances, once the user is finished, the electronic device (and/or another device) may store data (e.g., configuration data) representing the associations. In some instances, the electronic device may further associate the configuration data with data (e.g., identifier data) associated with the control device.

When associating the input devices with the various general controls, the general controls may be associated with a specific type of control device that is configured for use with the network applications. For example, a corporation, business, manufacturer, and/or the like may manufacture the specific type of control device that is to be used for controlling the network applications. For instance, the specific type of control device may include input devices that are necessary for controlling the network applications. However, other types of control device may not include the same input devices. As such, initially, the system may be unable to use the inputs from the other types of control devices when updating the states of the network applications.

As such, the electronic device provides the other types of control devices with the ability to be used for controlling the network applications by associating the input devices of the other types of control devices with the input devices of the specific type of control device. For example, the specific type of control device may include three buttons, such as an X-button, a Y-button, and a Z-button. Another type of control device may include five buttons, such as an A-button, a B-button, a C-button, a D-button, and an E-button. In order to control a network application, the system may be required to receive inputs that are associated with the X-button, the Y-button, and the Z-button. As such, the user may configure the electronic device such that the A-button of the other type of control device is associated with the X-button, the B button of the other type of control device is associated with the Y-button, and the C-button of the other type of control device is associated with the Z-button.

Additionally to, or alternatively from, associating the control device with general control for network applications, the electronic device may configure the control device for a specific network application. For instance, the network application may include various controls that are necessary for controlling the network application. For example, if the network application includes a gaming application where a character is controlled by the user, the controls may include a first control to move the character forward, a second control to move the character backwards, a third control to cause the character to jump, a fourth control to cause the character to pick up items, and/or any other type of control. As such, the electronic device may be configured in order to associate (e.g., map) the input devices of the control device with the controls of the network application.

In some instances, to configure the control device with the network application, the electronic device may receive, from a remote system, data representing the various controls for the network application. The control device, the electronic device, and/or the display device may then request that the user associate input devices with the various controls. For example, the display device may present content associated with a control, such as jump. The control device may then receive an input selecting an input device and send data representing the input to the electronic device. The electronic device may then associate the selected input device with the control of the network application. This process may then be repeated for the other controls of the network application. In some instances, once the user is finished, the electronic device (and/or another device) may store data (e.g., configuration data) representing the associations. In some instances, the electronic device may further associate the configuration data with data (e.g., identifier data) associated with the control device.

After configuring the electronic device, the electronic device may use the configuration data (e.g., the network application specific configuration data, the general configuration data, etc.) for the network application. For instance, as the control device is receiving inputs using the input devices, the electronic device may receive data (e.g., input data) representing the inputs. The electronic device may then use the configuration data to determine which controls are being selected by the user. For instance, if the configuration data associates a first input device (e.g., the A-button) with a first control (e.g., the X-button), and the input data represents a selection of the first input device, then the electronic device may use the configuration data to determine the first control. The electronic device may then send data (e.g., control data) representing the first control (e.g., the selection of the X-button) to the remote system. Additionally, the electronic device may repeat this process as the electronic device continues to receive the input data.

In some instances, the electronic device may perform similar processes for configuring the electronic device with other network applications and/or control devices. Additionally, for each configuration, the electronic device may store the configuration data, which the electronic device may use the next time the user is playing the network application using the control device.

For example, after previously configuring a control device with a control device and/or network application, the user may attach the electronic device to the control device. The electronic device may then receive, from the control device, data (e.g., identifier data) representing the control device. Using the identifier data, the electronic device may identify the control device. Additionally, the electronic device may receive, from the remote system, data (e.g., application data) representing a network application being executed by the remote system. Using the network application data, the electronic device may identify the network application. The electronic device may then identify configuration data for the control device using the identity of the control device and/or the network application data. For instance, the electronic device may identify that the configuration data is associated with the control device and/or the network application. Additionally, the electronic device may use the configuration data for converting the inputs received by the control device.

Although the above example describes the electronic device as storing the configuration data, in other examples, another device may store the configuration data. For example, the remote system may store the configuration data. The remote system may then receive the identifier data from the electronic device and identify the configuration data using the identifier data. After identifying the configuration data, the remote system may send the configuration data to the electronic device. Again, the electronic device may use the configuration data for converting the inputs received by the control device.

In some instances, such as when the electronic device includes an internal power source (e.g., one or more batteries), the electronic device may use one or more techniques for conserving power of the electronic device. For example, the electronic device may switch between a first mode of operation, in which one or more components of the electronic device are activated (e.g., turned on, receiving power, etc.), to a second mode of operation, in which the one or more components are deactivated (e.g., turned off, no longer receiving power, etc.). The one or more components may include, but are not limited to, one or more processors, one or more network interfaces, and/or the like.

In some instances, the electronic device may switch to the second mode of operation when the electronic device does not receive data (e.g., input data) from the control device for a threshold period of time. As described herein, a threshold period of time may include, but is not limited to, two seconds, five seconds, and/or any other time period. In some instances, the electronic device may switch to the second mode of operation at given time intervals. As described herein, a given time interval may include, but is not limited to, a millisecond, a second, and/or any other time interval. Still, in some instances, the electronic device may switch to the second mode of operation for one or more other reasons.

After switching to the second mode of operation, the electronic device may switch back to the first mode of operation. In some instances, such as when the electronic device switches to the second mode of operation based on not receiving input data for the threshold period of time, the electronic device may switch back to the first mode of operation based on receiving input data. In some instances, such as when the electronic device switches to the second mode of operation based on the elapse of the given time interval, the electronic device may then switch back to the first mode of operation at the elapse of another given time interval. In any of the examples described above, the electronic device may conserve power by switching between the modes of operation.

In some instances, the electronic device may further receive data from the remote system and send the data to the control device. For example, the electronic device may receive audio data representing sound associated with a state of the network application. The electronic device may then send the audio data to the control device, which may use the audio data to output the sound. In some instances, the electronic device may receive timestamp data representing a timestamp indicating when to output the sound. In such instances, the electronic device may further send the timestamp data to the control device so that the control device can use the timestamp data when outputting the sound.

As described herein, the remote system may provide the user with network applications which are controlled by various control devices. For example, the remote system may further store data representing one or more network applications that are accessible by the control devices via a network. An application can include, but is not limited to, a gaming application, a word processing application, an educational application, a multimedia application (e.g., movie, music, etc.), and/or any other type of application that is capable of being accessed via the network. The remote system may associate one or more of the network applications with a user profile. For instance, the remote system may receive data indicating that the user has acquired (e.g., purchased, leased, etc.) an application from the remote system. In some instances, the remote system may then store, in the user profile, data indicating that the user acquired by the network application.

To access an application, a control device may connect to the electronic device, which may then connect to the network using the network data. The control device and/or the electronic device may then send, to the remote system, data representing at least the identifier associated with the control device and/or the electronic device. The remote system may receive the data and determine, using the user profile, that the data is received from the control device and/or the electronic device. The remote system may further determine, using the user profile, that the control device and/or the electronic device is associated with at least a display device. In some instances, the remote system may then send, to the display device, data (e.g., video data, audio data, etc.) representing the one or more applications acquired by the user. In some instances, the remote system may send, to the display device, data (e.g., video data, audio data, etc.) representing one or more additional applications that are accessible for the user. In either example, the display device may receive the data and display content that identifies the one or more applications. For instance, the content may include a respective identifier (e.g., a name) of each of the one or more applications that are accessible to the user.

The remote system may then receive, from the electronic device, data (e.g., input data) representing a selection of a network application. Based at least in part on the data, the remote system may begin executing data (e.g., computer code) representing the network application. The remote system may then begin receiving, from the electronic device, data representing inputs received by the control device. In some instances, the electronic device sends the data each time the control device receives an input. In some instances, the electronic device sends the data at given time intervals (e.g., every millisecond, ten milliseconds, second, etc.). In either instance, the remote system uses the data to update the state of the network application based on the input(s) being received by the control device. The remote system may then send data representing the states of the network application to the display device.

For instance, the remote system may send, to the display device, data (e.g., video data, audio data, etc.) representing a first state of the network application. For example, if the network application includes a gaming application, the first state of the network application may include an object (e.g., a character) located at a first position within a gaming environment (e.g., a forest). The display device may receive the data from the remote system. Using the data, the display device may display image(s) representing the first state of the network application. For example, and again if the network application includes the gaming application, the display device may display content representing the object located at the first position within the gaming environment. In some instances, the display device may further output sound represented by the audio data. The user may then use the control device to provide inputs to the network application via the remote system.

For instance, the control device may receive an input, such as a selection of an input device. The electronic device may then send, to the remote system, data representing the input and/or the control associated with the network application. Using the data, the remote system may update the first state of the network application to a second state of the network application. For example, and again if the network application includes the gaming application, the input may be associated with moving the object forward by a given amount within the gaming environment. As such, the remote system may update the first state of the of the network application to the second state of the network application by moving the object forward in the environment by the given amount.

The remote system may then send, to the display device, data (e.g., video data, audio data, etc.) representing the second state of the network application. The display device may display image(s) representing the second state of the game. For example, the display device may display content representing the object located at the second position within the gaming environment. Additionally, in some instances, the display device may further output sound represented by the audio data. The remote system may then continue to perform similar processes to update the state of the network application on the display device as the remote system continues to receive data from the control device.

In some instances, the remote system may further send data (e.g., video data, audio data, etc.) to the electronic device, where the data is associated with the state of the network application being displayed by the display device. For example, the remote system may send, to the electronic device, audio data that represents sound corresponding to a current state of the network application being displayed by the display device. The electronic device may send the audio data to the control device, which may then output the sound. In some instances, when sending audio data to the electronic device, the remote system, the control device, and/or another device may synchronize the output of the audio data with the current state of the network application.

For a first example, the remote system may generate first timestamp data representing a first timestamp associated with the data being sent to the display device and/or second timestamp data representing a second timestamp associated with the audio data being sent to the control device. The remote system may then send the first timestamp data to the display device and the second timestamp data to the electronic device. In some instances, the remote system sends the first timestamp data as part of a first data packet to the display device, where the first data packet further includes the video data. In other instances, the remote system sends the first timestamp data to the display device separately from the video data. Additionally, in some instances, the remote system sends the second timestamp data as part of a second data packet to the electronic device, where the second data packet further includes the audio data. In other instances, the remote system sends the second timestamp data to the electronic device separately from the audio data.

The second timestamp data may be used by the control device to synchronize the output of the audio data with the displaying of the current state of the network application by the display device. For instance, the first timestamp data may include a first instruction to display the current state of the network application at a first time and the second timestamp data may include a second instruction to output the sound at a second time, where the first time is similar to (e.g., the same as, with a threshold period of time to, etc.) the second time. As such, the control device may store the audio data and/or the second timestamp data in a buffer. The control device may then determine when a current time includes the second time represented by the second timestamp data. When the current time includes the second time, the control device may output the sound represented by the audio data.

For a second example, the remote system may send the audio data, the video data, the first timestamp data, and the second timestamp data to a separate device, such as a dongle. The separate device may then use the first timestamp data and the second timestamp data to determine when to respectively send the video data to the display device and send the audio data to the electronic device. For instance, at the first time, the separate device may send the video data to the display device. Based at least in part on receiving the video data, the display device may display the current state of the network application. Additionally, at the second time, the separate device may send the audio data to the electronic device. Based at least in part on receiving the audio data, the control device may output the sound.

In some instances, such as when the network application includes a gaming application, the remote system may perform similar processes and/or techniques as a video game console, a computing device, a tablet, and/or other electronic device to process the data received by the electronic device. However, unlike a traditional video game console, computing device, table, and/or other electronic device that is executing a gaming application, the remote system may be remote from the control device and/or the display device. For instance, the control device and/or the display device may be located in a user's environment, such as the user's home, apartment, office, and/or the like. The remote system may be remote from the user's environment and communicate with each of the control device and the display device via the network.

In some instances, the electronic device is associated with a specific type of control device. For example, the electronic device may be configured to generate and/or receive configuration data associated with the specific type of control device, but not other control devices. In other instances, the electronic device may be associated with multiple types of control devices. For example, the electronic device may be configured to generate and/or receive configuration data associated with different types of control devices. The electronic device may include a triangular shape, a circular shape, a square shape, a rectangular shape, and/or any other types of shape.

In the above examples, the remote system may be located remotely from the control device and the display device. For example, the control device and the display device may be located in an environment, such as a user's home, apartment, business, and/or the like. The remote system may then be located remotely from the environment, such as a cloud-based system. In other instances, the remote system may be located in the same environment as the control device and/or the display device. For instance, the remote system may include a device that is located within the environment.

Although the above examples describe network applications being executed by the remote system, in other examples, the electronic device may perform similar processes for applications (e.g., games) being executed by a local device, such as a video game console. For example, if the user is using a first gaming controller that is associated with a first game console to play a game being executed by a second game console, then the electronic device may associate the input devices of the first gaming controller with the controls of the game. The electronic device may then receive the input data from the first gaming controller and send the data representing the controls to the second video game console. This way, the electronic device causes the first game controller to be compatible with second video game console.

FIG. 1 illustrates a schematic diagram of an example system 100 for controlling network applications using an electronic device 102 connected to a control device. The system 100 may include, for example, a remote system 104, a control device 106, and a display device 108. The example of FIG. 1 further includes the electronic device 102 connected to the control device 106. In some instances, the electronic device 102 includes a wired connector, such as a USB, cable, and/or other types of connector, that the electronic device 102 uses to establish a wired connection with the control device 106. Additionally, or alternatively, in some instances, the electronic device 102 includes a network interface that the electronic device 102 uses to establish a wireless connection with the control device 106.

The electronic device 102 may further use network data 110 to establish a connection with a network device 112, such as an access point. Using the connection, the electronic device 102 may communicate with the remote system 104 over a network(s) 114, such as by using a communication channel. For instance, the electronic device 102 may send data to the remote system 104 and the remote system 104 may send data to the electronic device 102. Additionally, the display device 108 may communicate with the remote system 104 over the network(s) 114, such as by using a communication channel. For instance, the display device 108 may send data to the remote system 104 and the remote system 104 may send data to the display device 108. By sending and receiving data with the electronic device 102 and the display device 108, the remote system 104 allows a user 116 to control, via the remote system 104, the network application being executed by the remote system 104.

For instance, the remote system 104 may store application data 118 representing one or more network applications that are accessible by the control device 106 via the network(s) 114. A network application can include, but is not limited to, a gaming application, a word processing application, an educational application, a multimedia application (e.g., movie, music, etc.), and/or any other type of application that is capable of being accessed via the network(s) 114. In some instances, the remote system 104 may associate one or more of the network applications with a user profile. For instance, the remote system 104 may receive data indicating that the user 116 has acquired (e.g., purchased, leased, etc.) a network application from the remote system 104. In some instances, the remote system 104 may then store application data 118 indicating that the user 116 acquired by the network application. The remote system 104 may then allow the user 116 to access the network application using the control device 106.

To access a network application, the remote system 104 may send, to the display device 108, data (e.g., video data, audio data, etc.) representing one or more network applications that are available to the user 116. In some instances, the one or more network applications may include one or more network applications that have been acquired by the user 116. In some instances, the one or more network applications may include one or more network applications that are free to users. In either example, the display device 108 may receive the data from the remote system 104. The display device 108 may then display image(s) that represent the one or more network applications that are available to the user 116. For example, the image(s) may include one or more identifiers (e.g., one or more names) of the one or more network applications that are available to the user 116.

The remote system 104 may then receive, from the electronic device 102, input data 120 representing input(s) received by the control device 106. The remote system 104 may analyze the input data 120 to identify a network application that is selected by the user 116. For example, the input(s) may correspond to movement(s) of an object, such as a cursor, across the image(s) representing the one or more network applications. The input(s) may further correspond to a selection of one of the network applications (e.g., a selection of a control on the control device 106 when the object is located over the selected network application). The remote system 104 may then determine, based at least in part on the selection, that the user 116 selected the network application.

In the example of FIG. 1, the user 116 may need to configure the electronic device 102 with the control device 106 and/or the selected network application, such as when the electronic device 102 has yet to be used with the control device 106 to control the network application. To configure the electronic device 102, the electronic device 102 may receive, from the remote system 104, setup data 122 representing one or more controls associated with the network applications and/or a specific network application. As described herein, a control associated with a network application may include any input that may be processed by the remote system 104 in order to update a state of the network application.

For a first example, the remote system 104 may be configured to process specific controls for the network applications. The specific controls may include a first control associated with a joystick, a second control associated with a first type of button (e.g., an X-button), a third control associated with a second type of button (e.g., a Y-button), and/or the like. In some instances, the specific controls are associated with a specific type of control device that is manufactured to control the network applications. For example, the specific type of control may include input devices that include the joystick, the first type of button, the second type of button, and/or the like.

For a second example, the controls may specific to a network application. For instance, and in the example of FIG. 1, the network application may include a gaming application in which the user 116 controls an object, such as a character. As such, the controls may include, but are not limited to, a first control to move the character forward, a second control to move the character left, a third control to move the character right, a fourth control to move the character backwards, a fifth control to make the character jump, a sixth control to make the character perform an action (e.g., open a door, pickup an item, etc.), and/or any other type of control.

The electronic device 102, the control device 106, and/or the display device 108 may then request that the user 116 associate input devices of the control device 106 with the various controls. For example, and using the example above where the network application includes the gaming application, the display device 108 may display content associated with the first control (e.g., the joystick). The electronic device 102 may then receive input data 120 representing a selection of a first input device of the control device 106. Using the input data 120 and the setup data 122, the electronic device 102 may generate configuration data 124 that associates the selected first input device with the first control. Next, the display device 108 may display content associated with the second control (e.g., the X-button). The electronic device 102 may then receive input data 120 representing a selection of a second input device of the control device 106. Using the input data 120 and the setup data 122, the electronic device 102 may generate configuration data 124 that associates the selected second input device with the second control. This process may continue until the user 116 has configured the controls of the network application. The electronic device 102 may then end the configuration process.

In some instances, the configuration data 124 may represent mapping data that maps the various input devices of the control device 106 with the various controls of the network application(s). For instance, the configuration data 124 may map an identifier of an input device with an identifier of the control of the network application. For example, if the input device includes a button, such as an A-button, and the control includes a second button, such as an X-button, the configuration data 124 may map the identifier of the "A-button" with the identifier of the control "X-button".

In some instances, the electronic device 102 stores the configuration data 124 such that the electronic device 102 can use the configuration data 124 when the user 116 uses the control device 106 to control the network application. For instance, the electronic device 102 may store the configuration data 124 in association with identifier data 126 representing an identifier of the network application and/or identifier data 126 representing an identifier of the control device 106. Additionally, or alternatively, in some instances, the electronic device 102 may send, to the remote system 104, the configuration data 124 for storage by the remote system 104. The electronic device 102 may then receive, from the remote system 104, the configuration data 124 when the user 116 uses the control device 106 to control the network application.

It should be noted that, in some examples, in addition to, or alternatively from, the electronic device 102 generating the configuration data 124, the configuration data 124 may have be previously generated and stored on the remote system 104. In such instances, the remote system 104 may send the configuration data 124 to the electronic device 102 based at least in part on determining the type of control device for which the electronic device 102 is connected and/or the identifier of the network application for which the control device 106 is being used to control. In other words, the remote system 104 may store configuration data 124 for various types of control devices and/or network applications. The remote system 104 may then provide the needed configuration data 124 to electronic devices that are connected to control devices when the control devices are used to control network applications. This may remove the need for the electronic device 102 to perform configuration whenever the electronic device 102 is connected to a new type of control device and/or being used to control a new network application.

The electronic device 102 may then use the configuration data 124 when the user 116 is controlling the network application using the control device 106. For instance, the electronic device 102 may receive, from the control device 106, input data 120 representing a selection of an input device of the control device 106. The electronic device 102 may then use the configuration data 124 to determine that the input device is associated with a control of the network application. Based at least in part on the determination, the electronic device 102 may generate control data 128 representing the control. The electronic device 102 may then send the control data 128 to the remote system 104. Additionally, the electronic device 102 may continue to perform this process of receiving input data 120 representing the selections of the input devices, determining that the input devices are associated with controls, generating the control data 128 representing the controls, and sending the control data 128 to the remote system 104.

In some instances, the electronic device 102 sends the control data 128 to the remote system 104 whenever the electronic device 102 receives the input data 120 from the control device 106. This may reduce the latency it takes between the control device 106 receiving the input and the remote system 104 receiving the control data 128. In some instances, the electronic device 102 sends the control data 128 at given time intervals. The electronic device 102 may send the control data 128 at the given time intervals when the electronic device 102 is performing processes to conserve internal power, which is described with respect to FIG. 3.

The remote system 104 may use this control data 128 to update the state of the network application. For example, the remote system 104 may send, to the display device 108, data representing a first state of the network application. The data may include first video data 130 representing image(s) of the first state of the network application, first audio data 132 representing sound corresponding to the first state of the network application, and/or first timestamp data 134 representing a time for displaying the first state of the network application and/or a time for outputting the sound. In some instances, the remote system 104 sends a first data packet that includes the first video data 130, the first audio data 132, and/or the first timestamp data 134. In other instances, the remote system 104 may separately send the first video data 130, the first audio data 132, and/or the first timestamp data 134 to the display device 108.

The display device 108 may receive the data (and/or the first data packet) from the remote system 104. Using the first video data 130, the display device 108 may display image(s) representing the first state of the network application. For example, if the network application includes a gaming application, the display device 108 may display content representing a first state of the game. In the example of FIG. 1, the first state of the game may include an object (e.g., a character) located at a first position in a gaming environment (e.g., a forest). In some instances, the display device 108 may further output the sound represented by the first audio data 132. In some instances, the display device 108 displays the image(s) and/or outputs the sound according to the time(s) represented by the first timestamp data 134.

In some instances, the remote system 104 may additionally send, to the electronic device 102, data representing the first state of the network application. The data may include second audio data 132 representing sound corresponding to the first state of the network application and/or second timestamp data 134 representing a time for outputting the sound. In some instances, the remote system 104 sends a second data packet that includes the second audio data 132 and/or the second timestamp data 134. In other instances, the remote system 104 may send the second audio data 132 separately form the second timestamp data 134. The electronic device 102 may then send the data to the control device 106, which may output the sound represented by the second audio data 132. In some instances, the control device 106 may output the sound according to the time represented by the second timestamp data 134. In some instances, the first timestamp data 134 and/or the second timestamp data 134 synchronizes the outputting of the sound by the control device 106 with the displaying of the image(s) by the display device 108.

The user 116 can then use the control device 106 to provide inputs to the network application. For instance, the control device 106 may receive an input, such as a selection of an input device. The control device 106 may then send, to the electronic device 102, input data 120 representing the selection of the input. Using the configuration data 124, the electronic device 102 may determine that the input device is associated with a control. The electronic device 102 may then generate control data 128 representing the control and send the control data 128 to the remote system 104.

Using the control data 128, a processing component 136 may update the first state of the network application to a second state of the network application. For example, and using the example above where the network application includes the gaming application, the control may be associated with moving the object forward by a given amount within the gaming environment. As such, the processing component 136 may analyze the control data 128 to determine that the input includes moving the object forward by the given amount. The processing component 136 may then update the first state of the of the network application to the second state of the network application by moving the object forward in the environment by the given amount.

The remote system 104 may then send data representing the second state of the network application to the display device 108. The data may include third video data 130 representing image(s) of the second state of the network application, third audio data 132 representing sound corresponding to the second state of the network application, and/or third timestamp data 134 representing a time for displaying the second state of the network application and/or a time for outputting the sound. In some instances, the remote system 104 sends a third data packet that includes the third video data 130, the third audio data 132, and/or the third timestamp data 134. In other instances, the remote system 104 may separately send the third video data 130, the third audio data 132, and/or the third timestamp data 134 to the display device 108.

The display device 108 may receive the data (and/or the third data packet) from the remote system 104. Using the third video data 130, the display device 108 may display image(s) representing the second state of the network application. For example, and again using the example where the network application includes the gaming application, the display device 108 may display the object located at the second position within the gaming environment. In some instances, the display device 108 may further output the sound represented by the third audio data 132. In some instances, the display device 108 displays the image(s) and/or outputs the sound according to the time(s) represented by the third timestamp data 134.

In some instances, the remote system 104 may additionally send, to the electronic device 102, data representing the second state of the network application. The data may include fourth audio data 132 representing sound corresponding to the second state of the network application and/or fourth timestamp data 134 representing a time for outputting the sound. In some instances, the remote system 104 sends a fourth data packet that includes the fourth audio data 132 and/or the fourth timestamp data 134. In other instances, the remote system 104 sends the fourth audio data 132 separately from the fourth timestamp data 134. In either instance, the electronic device 102 then sends the data to the control device 106, which may then output the sound represented by the fourth audio data 132. In some instances, the control device 106 may output the sound according to the time represented by the fourth timestamp data 134. In some instances, the third timestamp data 134 and/or the fourth timestamp data 134 synchronizes the outputting of the sound by the control device 106 with the displaying of the image(s) by the display device 108.

In some instances, the remote system 104 may continue to receive control data 128 from the electronic device 102. The processing component 136 may then continue to process the control data 128 in order to update the state of the network application. Based at least in part on the updating, the remote system 104 may continue to send, to the display device 108, data (e.g., video data 130, audio data 132, timestamp data 134, etc.) representing the current state of the network application. In some instances, the remote system 104 sends the data to the display device 108 as a data packet. The remote system 104 may further send, to the electronic device 102, data (e.g., audio data 132, timestamp data 134, etc.) representing the current state of the network application. In some instances, the remote system 104 sends the data to the electronic device 102 as part of a data packet.

By performing the processes described above, the user 116 is able to control the network application, being executed by the remote system 104, using different types of control devices. For example, and using similar processes, the user 116 may attach the electronic device 102 to a second, different type of control device. The electronic device 102 may then perform the configuration processes described herein in order to obtain configuration data 124 for the second control device. Additionally, the electronic device 102 may use the configuration data 124 to send control data 128 to the remote system 104 as the second control device is receiving the inputs from the user 116.

As further illustrated in the example of FIG. 1, the user 116 may have an electronic device 138 that the user 116 uses to initially configure the electronic device 102 with the network data 110. For example, when the electronic device 102 is first turned on, the electronic device 102 may output a signal that is received the electronic device 138, where the signal is associated with configuring the electronic device 102. The electronic device 138 may then receive, from the user 116, inputs representing the network configuration data and send the network data 110 to the electronic device 102.

Figure 2:
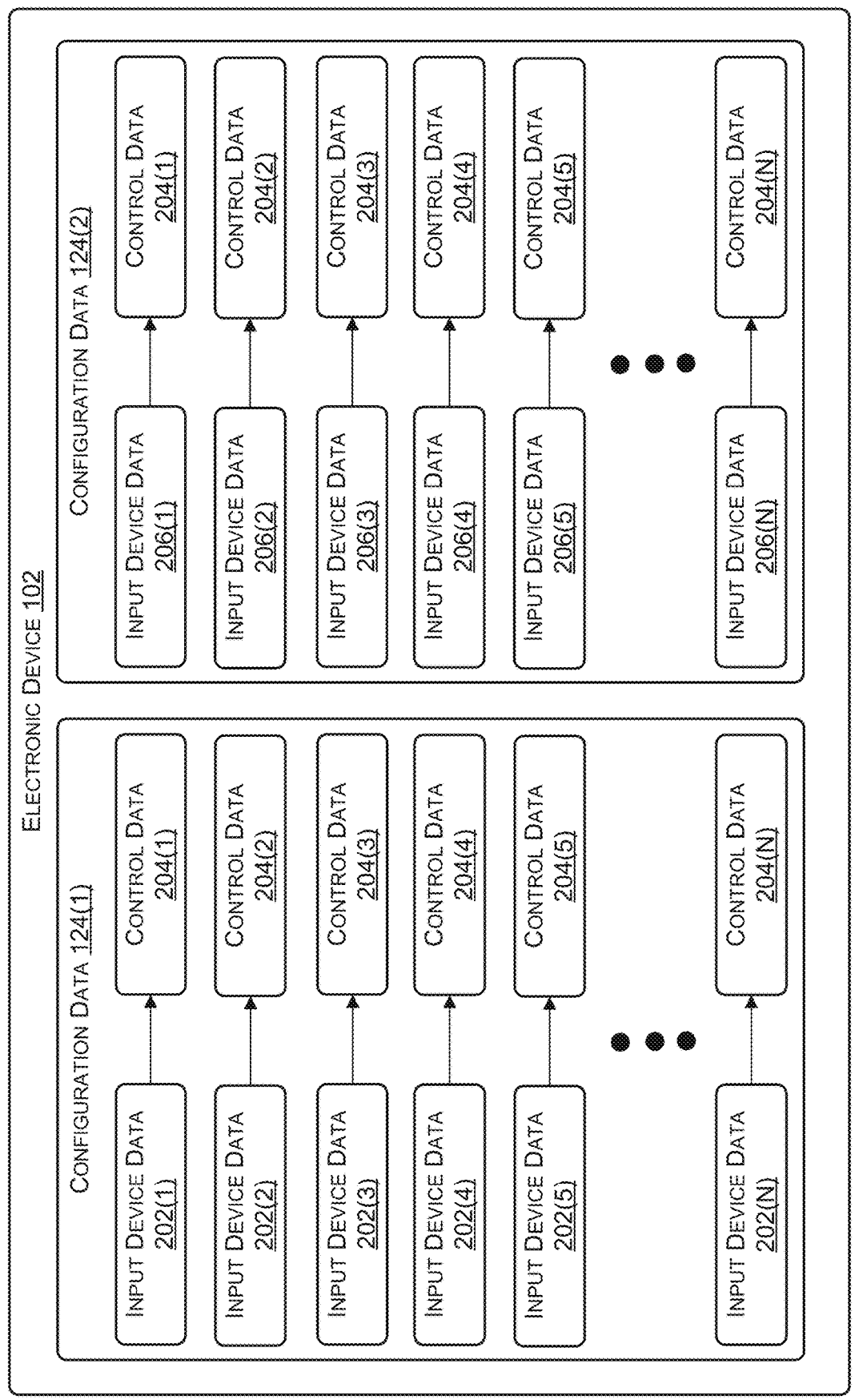
FIG. 2 illustrates examples of associations between input devices of control devices and controls of a network application, according to various aspects of the present disclosure.

FIG. 2 illustrates examples of associations between input devices of control devices and controls of network application(s). For example, the user 116 may have connected the electronic device 102 with multiple control devices in order to control network application(s). For each control device, the user 116 may have configured the electronic device 102 such that the control device is able to control the network application(s). For a first example, the first control device may include various input devices. The input devices may include, but are not limited to, joystick(s), button(s), key(s), touch-sensitive pad(s), microphone(s), and/or the like.

The network application(s) may include various controls that the user 116 may input while controlling the network application(s). For a first example, if the network application(s) are associated with a specific type of control device, then the controls may include input devices that are included on the specific type of control device. For example, the controls may include a first control associated with a joystick, a second control associated with a first type of button (e.g., X-button), a third control associated with a second type of button (e.g., Y-button), a fourth control associated with a third type of button (e.g., Z-button), and/or the like.

For another example, and if the network application includes a gaming application, the controls may include, but are not limited to, a first control for moving a character forward, a second control for moving a character backwards, a third control for moving a character left, a fourth control for moving a character right, a fifth control for making a character jump, a sixth control for making a character perform an action, and/or the like. As such, and in either example, to configure the first control device, the user 116 may associate at least a respective input device of the first control device with each of the controls of the network application(s).

For example, the electronic device 102 may receive setup data 122 from the remote system 104. The setup data 122 may represent the controls associated with the network application(s). The electronic device 102 may then receive, from the first control device, input data 120 representing selections of the input devices of the first control device. Using the setup data 122 and the input data 120, the electronic device 102 may generate the configuration data 124(1) for the first control device. As shown, the configuration data 124(1) associates (e.g., maps) input device data 202(1)-(N) with control data 204(1)-(N) (which may represent, and/or include, the control data 128).

For example, the input device data 202(1) may represent an identifier associated with a first input device of the first control device. As described herein, an identifier associated with an input device may include, but is not limited to, a name, a numerical identifier, an alphabetic identifier, a mixed numerical and alphabetic identifier, and/or any other type of identifier that can be used to identify the input device. The control data 204(1) may represent an identifier associated with the first control of the network application(s). As described herein, an identifier associated with a control may include, but is not limited to, a name, a numerical identifier, an alphabetic identifier, a mixed numerical and alphabetic identifier, and/or any other type of identifier that can be used to identify the control. As shown, the electronic device 102 creates a link, which is represented by the arrow, between the input device data 202(1) and the control data 204(1). As such, the configuration data 124(1) associates the first input device of the first control device with the first control of the network application(s). The electronic device 102 may perform similar processes for associating the other input devices of the first control device with the other controls of the network application.

For a second example, the second control device may include various input devices. The input devices may include, but are not limited to, joystick(s), button(s), key(s), touch-sensitive pad(s), microphone(s), and/or the like. While connected to the second control device, the electronic device 102 may receive setup data 122 from the remote system 104. The setup data 122 may represent the controls associated with the network application(s). The electronic device 102 may then receive, from the second control device, input data 120 representing selections of the input devices of the second control device. Using the setup data 122 and the input data 120, the electronic device 102 may generate the configuration data 124(2) for the second control device. As shown, the configuration data 124(2) associates (e.g., maps) input device data 206(1)-(N) with the control data 204(1)-(N).

For example, the input device data 206(1) may represent an identifier associated with a first input device of the second control device. As shown, the electronic device 102 creates a link, which is represented by the arrow, between the input device data 206(1) and the control data 204(1). As such, the configuration data 124(2) associates the first input device of the second control device with the first control of the network application(s). The electronic device 102 may perform similar processes for associating the other input devices of the second control device with the other controls.

As such, the electronic device 102 may be capable of allowing the first control device to control the network application(s) using the configuration data 124(1) and the second control device to control the network application(s) using the configuration data 124(2). For example, and by using the device, the user is able to input the same control associated with the network application(s) using an input device of the first control device and an input device of the second control device. In other words, the electronic device 102 may allow the user 116 to use more than one type of control device to control the same network application.

Figure 3:
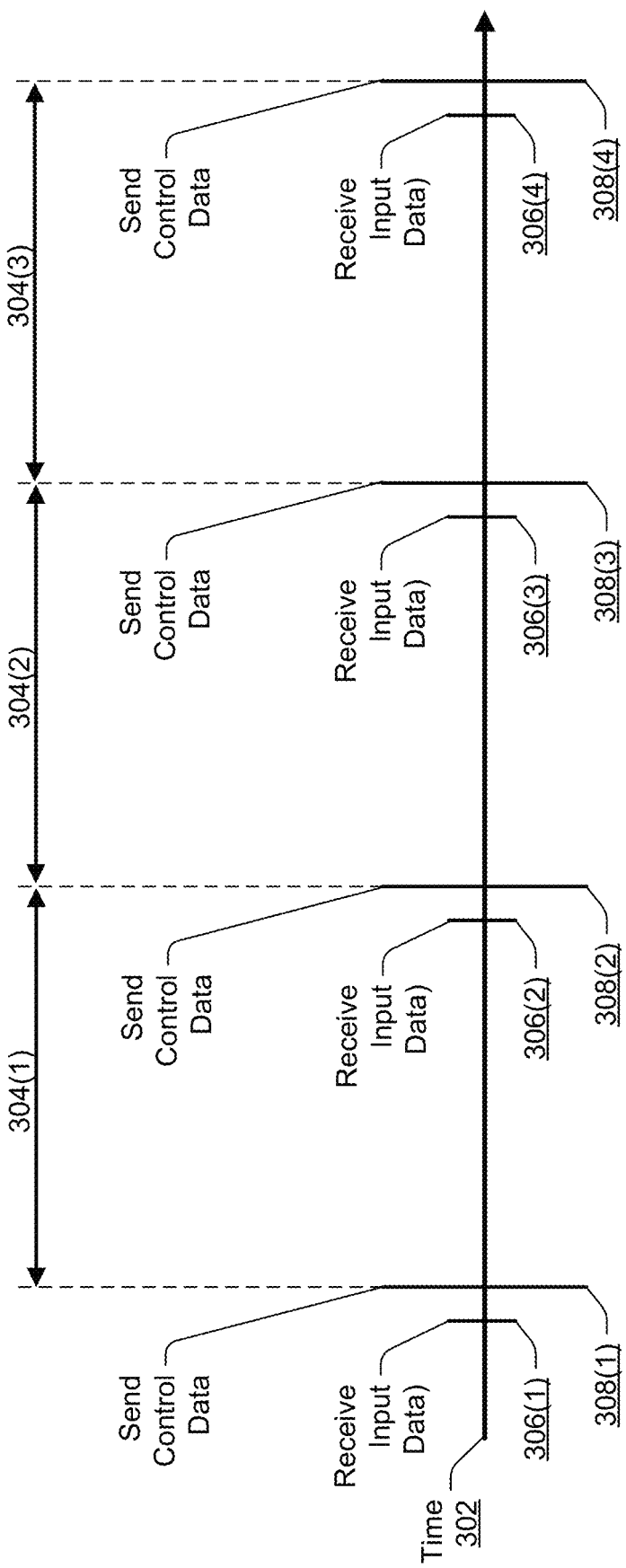
FIG. 3 illustrates an example of an electronic device sending low-latency transmissions while conserving power, according to various aspects of the present disclosure.

FIG. 3 illustrates an example of the electronic device 102 sending low-latency transmissions while conserving power, according to various examples of the present disclosure. For example, over a period of time 302, the electronic device 102 may send data to the network device 112 at given time intervals 304(1)-(3). For instance, the electronic device 102 may receive first input data 120 from the control device 106 at time 306(1). Based at least in part on the first input data 120, electronic device 102 may send first control data 128 to the network device 112 at time 308(1). The electronic device 102 may then receive second input data 120 at time 306(2). Based at least in part on the second input data 120, electronic device 102 may send second control data 128 to the network device 112 at time 308(2).

Additionally, the electronic device 102 may receive third input data 120 from the control device 106 at time 306(3). Based at least in part on the third input data 120, electronic device 102 may send third control data 128 to the network device 112 at time 308(3). Furthermore, the electronic device 102 may receive fourth input data 120 at time 306(4). Based at least in part on the fourth input data 120, electronic device 102 may send fourth control data 128 to the network device 112 at time 308(4).

In some instances, the electronic device 102 may switch between different modes of operation during the time period 302. For example, the electronic device 102 may switch between a first mode of operation, in which one or more components of the electronic device 102 are activated (e.g., turned on, receiving power, etc.), and a second mode of operation, in which the one or more components are deactivated (e.g., turned off, no longer receiving power, etc.). In some instances, the electronic device 102 switches to the second mode operation after sending the control data 128 and switches back to the first mode of operation before receiving the input data 120. This may conserve power on the electronic device 102 when the electronic device 102 is not sending or receiving data.

Figure 4:
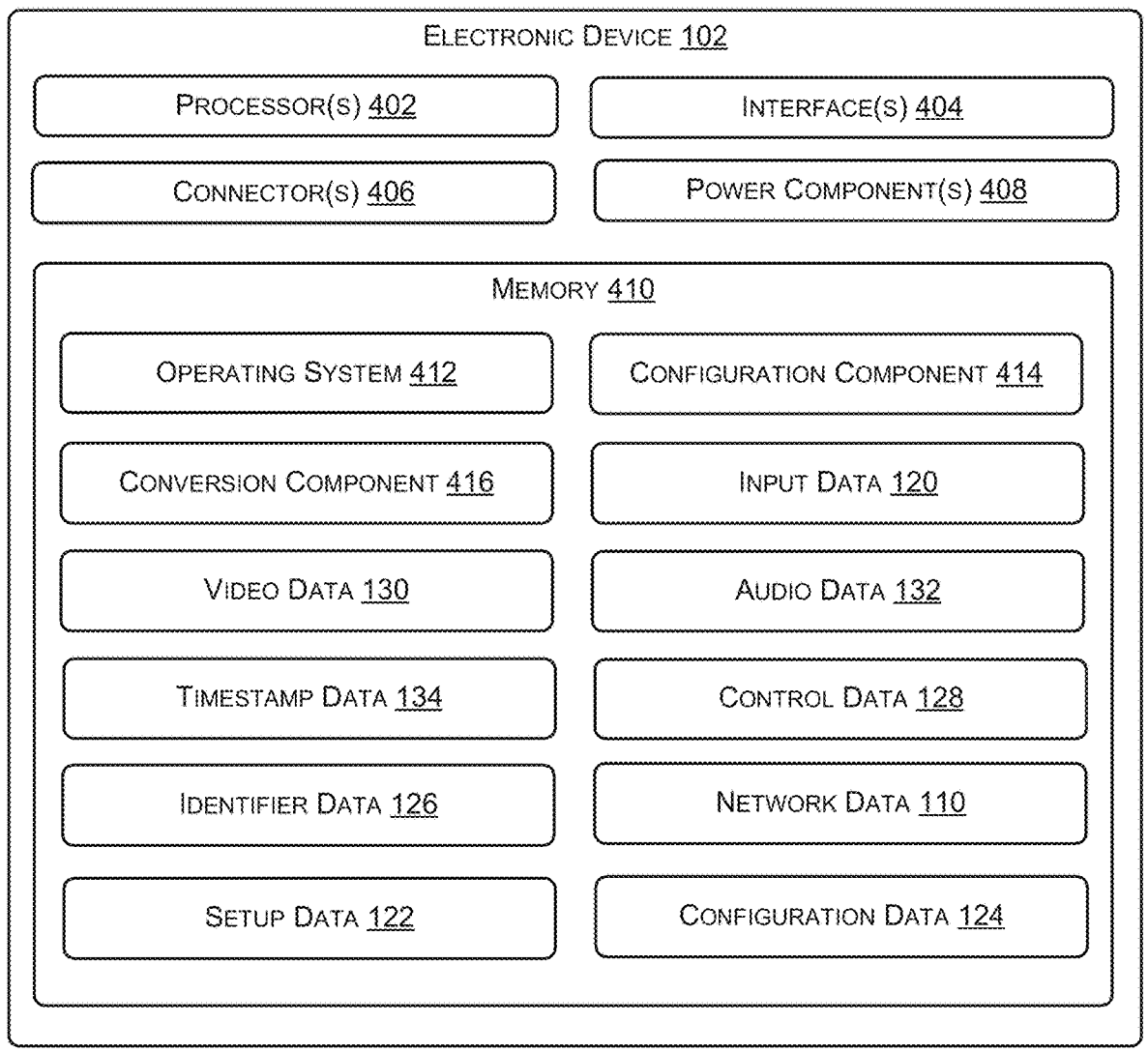
FIG. 4 illustrates a block diagram of an example architecture of an electronic device, according to various aspects of the present disclosure.

FIG. 4 illustrates a block diagram of an example architecture of the electronic device 102. As shown, the electronic device 102 may include processor(s) 402, network interface(s) 404, connector(s) 406, power component(s) 408, and memory 410. In some instances, the electronic device 102 may include one or more additional components not illustrated in the example of FIG. 4. Additionally, or alternatively, in some instances, the electronic device 102 may not include one or more of the network interface(s) 404, the connector(s) 406, or the power component(s) 408.

The power component(s) 408 may be configured to provide power to the electronic device 102. For a first example, power component(s) 408 may include one or more batteries. In such an example, the connector(s) 406 may include components that connector to a source of external power for charging the power component(s) 408. For a second example, the power component(s) 408 may include components connected to a source of external power, such as AC (alternating-current) power (alternatively referred to herein as "AC mains" or "wall power") and/or the control device 106.

As shown, the memory 410 may store at least an operating system 412, a configuration component 414, and a conversion component 416. The configuration component 414 may be configured to configure the electronic device 102 with various control devices and/or network applications. For instance, the configuration component 414 may determine that the electronic device 102 is to configure the control device 106 with a network application. As such, the configuration component 414 may use the setup data 122 associated with the network application and the input data 120 received from the control device 106 to generate the configuration data 124, using the processes described herein.

In some instances, the configuration component 414 determines to configure the control device 106 with the network device using identifier data 126 received from the control device 106. For a first example, and using the identifier data 126 associated with the control device 106, the configuration component 414 may determine that this is the first time that the electronic device 102 has connected to the control device 106 and as such, the electronic device 102 needs to be configured for the control device 106. For a second example, and again using the identifier data 126 associated with the control device 106, the configuration component 414 may determine that there is not configuration data 124 stored in the memory 410 and associated with the control device 106.

Additionally, or alternatively, in some instances, the configuration component 414 determines to configure the control device 106 with the network application using identifier data 126 associated with the network application, where the identifier data 126 may be received from the remote system 104. For a first example, and using the identifier data 126 associated with the network application, the configuration component 414 may determine that this is the first time that the electronic device 102 has connected to the control device 106 in order to control the network application. For a second example, and again using the identifier data 126 associated with the network application, the configuration component 414 may determine that there is not configuration data 124 stored in the memory 410 and associated with the network application.

In some instances, after configurating the control device 106 with the network application, such as by generating the configuration data 124, the configuration component 414 is configured to cause storing of the configuration data 124 in the memory 410. Additionally, or alternatively, in some instances, after configurating the control device 106 with the network application, the configuration component 414 is configured to cause the electronic device 102 to send the configuration data 124 to an external device, such as the remote system 104, the control device 106, the display device 108, and/or the like.

The conversion component 416 may be configured to convert the input received by the control device 106 to controls that can be used by the remote system 104 for updating the state of the network application. For example, the conversion component 416 may analyze the input data 120 received from the control device 106. Based at least in part on the analysis, the conversion component 416 may determine that the input data 120 represents selections of input devices of the control device 106. The conversion component 416 may then use the configuration data 124 to determine that the input devices are associated with controls of the network application. Based at least in part on the determinations, the conversion component 416 may generate the control data 128 representing the controls and cause the electronic device 102 to send the control data 128 to the remote system 104.

As further illustrated in FIG. 4, the electronic device 102 includes the processor(s) 402, the network interface(s) 404, and the memory 410. As used herein, a processor may include multiple processors and/or a processor having multiple cores. Further, the processors may comprise one or more cores of different types. For example, the processors may include application processor units, graphic processing units, and so forth. In one instance, the processor may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, processor(s) may possess its own local memory, which also may store program components, program data, and/or one or more operating systems.

Memory may include volatile and nonvolatile memory, removable and non-removable media implemented in any method or technology for storage of information, such as computer-readable instructions, data structures, program component, or other data. The memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, discussed herein, may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

Network interface(s) may enable messages between devices, such as the electronic device 102, the remote system 104, the control device 106, the display device 108, the network device 112, one or more other control devices, and/or with one or more other remote systems, as well as other networked devices. The network interface(s) may include one or more network interface controllers (NICs) or other types of transceiver devices to send and receive messages over the network(s) 114. For instance, each of the network interface(s) may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) may include a wide area network (WAN) component to enable message over a wide area network.

In some instances, the network interface(s), such as the network interface(s) 404, may include wired connector(s) for establishing wired connections between devices. The wired connector(s) may include, but are not limited to, USB(s), cable(s), wire(s), and/or any other type of physical connector.

Figure 5:
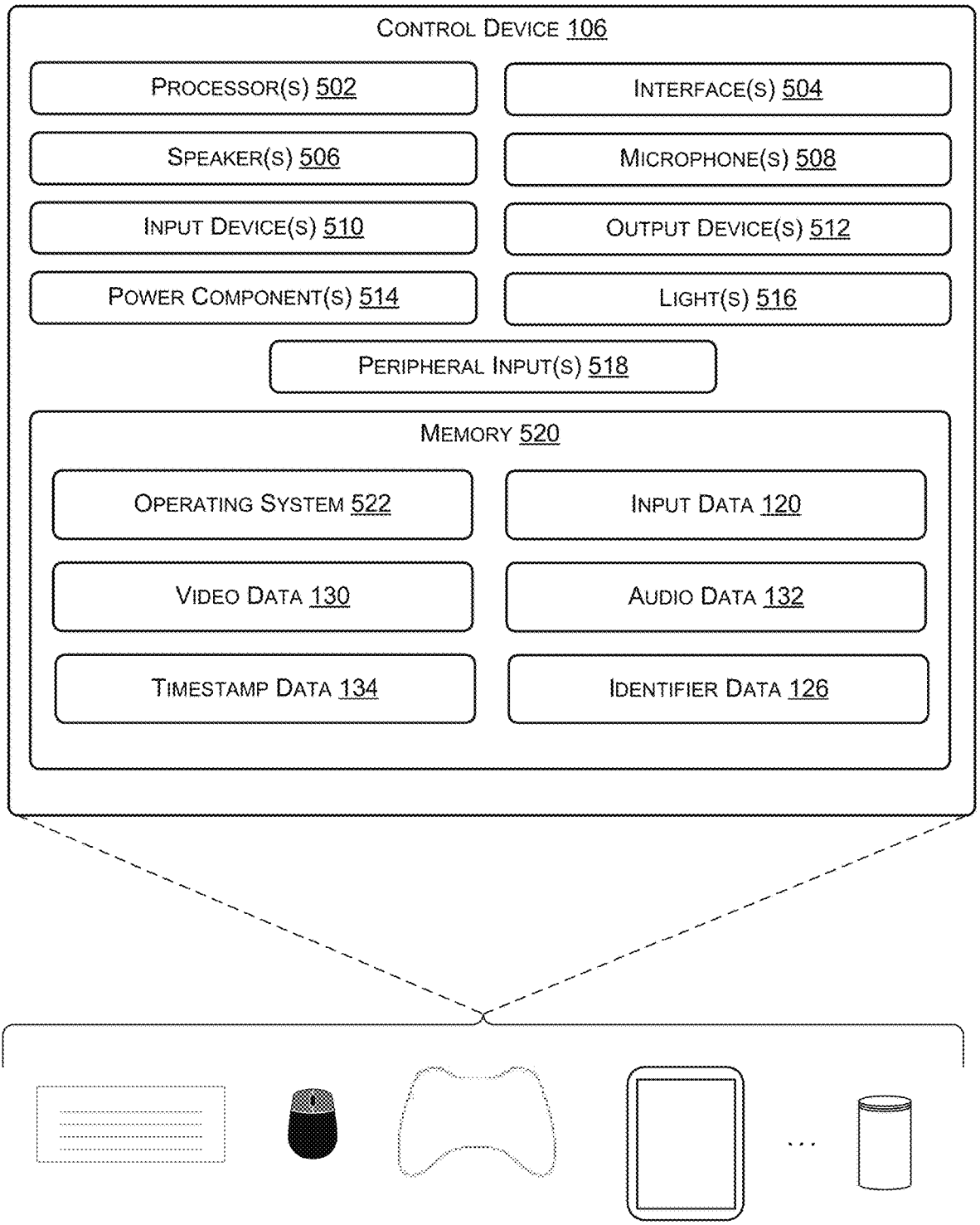
FIG. 5 illustrates a block diagram of an example architecture of a control device, according to various aspects of the present disclosure.

FIG. 5 illustrates a block diagram of an example architecture of the control device 106. As shown, the control device 106 includes processor(s) 502, network interface(s) 504, speaker(s) 506, microphone(s) 508, input device(s) 510, output device(s) 512, power component(s) 514, light(s) 516, peripheral input(s) 518, and memory 520. In some instances, the control device 106 may include one or more additional components not illustrated in the example of FIG. 5. Additionally, or alternatively, in some instances, the control device 106 may not include one or more of the speaker(s) 506, the microphone(s) 508, the input device(s) 510, the output device(s) 512, the light(s) 516, or the peripheral input(s) 518.

Although the control device 106 is illustrated as having one or more integral speaker(s) 506, in other examples, the control device 106 may not include speaker(s) 506. For example, the control device 106 may produce an audio output signal that drives an external loudspeaker, such as headphones connected to the control device 106 via a peripheral input 518. As another example, the control device 106 may drive or control an external loudspeaker through a wireless data connection such as a Bluetooth connection. In other situations, the control device 106 may be used in conjunction with a loudspeaker device that receives audio data and other instructions from the remote system 104, rather than from the control device 106.

The microphone(s) 508 may include sensors (e.g., transducers) configured to receive sound. The microphone(s) 508 may generate input signals for audio input (e.g., sound). For example, the microphone(s) 508 may determine digital input signals for an utterance of a user. In some instances, the microphone(s) 508 are implemented in an array. The array may be arranged in a geometric pattern, such as a linear geometric form, circular geometric form, or any other configuration. For example, for a given point, an array of four sensors may be placed in a circular pattern at 90 degree increments (e.g., 0, 90, 180, 5115) to receive sound from four directions. The microphone(s) 508 may be in a planar configuration, or positioned apart in a non-planar three-dimensional region. In some instances, the microphone(s) 508 may include a spatially disparate array of sensors in data communication. For example, a networked array of sensors may be included. The microphone(s) 508 may include omni-directional microphones, directional microphones (e.g., shotgun microphones), and so on.

In some instances, the microphone(s) 508 and the speaker(s) 506 facilitate interactions, such as dialogue, with a user. The microphone(s) 508 produce audio data representing sound from the environment of the control device 106, such speech utterances by the user. The audio data produced by the microphone(s) 508 may comprise directional audio signals or may be used to produce directional audio signals, where each of the directional audio signals emphasizes audio from a different radial direction relative to the microphone(s) 508.

The input device(s) 510 may include button(s), key(s), joystick(s), touch-sensitive pad(s), trigger(s), sensor(s) that detect movement of the control device 106 (e.g., accelerometer(s), magnetometer(s), etc.), and/or any other type of device that is able to receive input from the user. The output device(s) 512 may include devices that provide feedback to the user. For instance, the output device(s) 512 may include haptic driver(s) that cause actuator(s) to activate.

The power component(s) 514 may be configured to provide power to the control device 106. For a first example, power component(s) 514 may include one or more batteries. For a second example, the power component(s) 514 may include components connected to a source of external AC (alternating-current) power, such as a household AC power supply (alternatively referred to herein as "AC mains" or "wall power").

The light(s) 516 may include visual indicator(s) (e.g., light-emitting diodes (LEDs)) that emit light when activated by the control device 106. In some instances, the visual indicator(s) may include a light ring disposed on a portion of the control device 106. In other instances, the visual indicator(s) may be disposed on various portions on the control device 106. The peripheral input(s) 518 may include one or more components for connecting peripheral devices to the control device 106. For instance, a peripheral input 518 may include a jack for connecting headphones to the control device 106.

The control device 106 may include memory 520. The memory 550 may be used to store any number of software components that are executable by the processor(s) 502. Software components stored in the memory 520 may include an operating system 522 that is configured to manage hardware and services within and coupled to the control device 106.

As further illustrated in FIG. 5, the memory 520 may include the input data 120 generated by the control device 106, where the control device 106 sends the input data 120 to at least the electronic device 102. Additionally, the memory 520 may include the video data 130, the audio data 132, and/or the timestamp data 134 that the control device 106 receives from the electronic device 102. Additionally, the memory 520 may store the identifier data 126 that the control device 106 may send to the electronic device 102.

Figure 6:
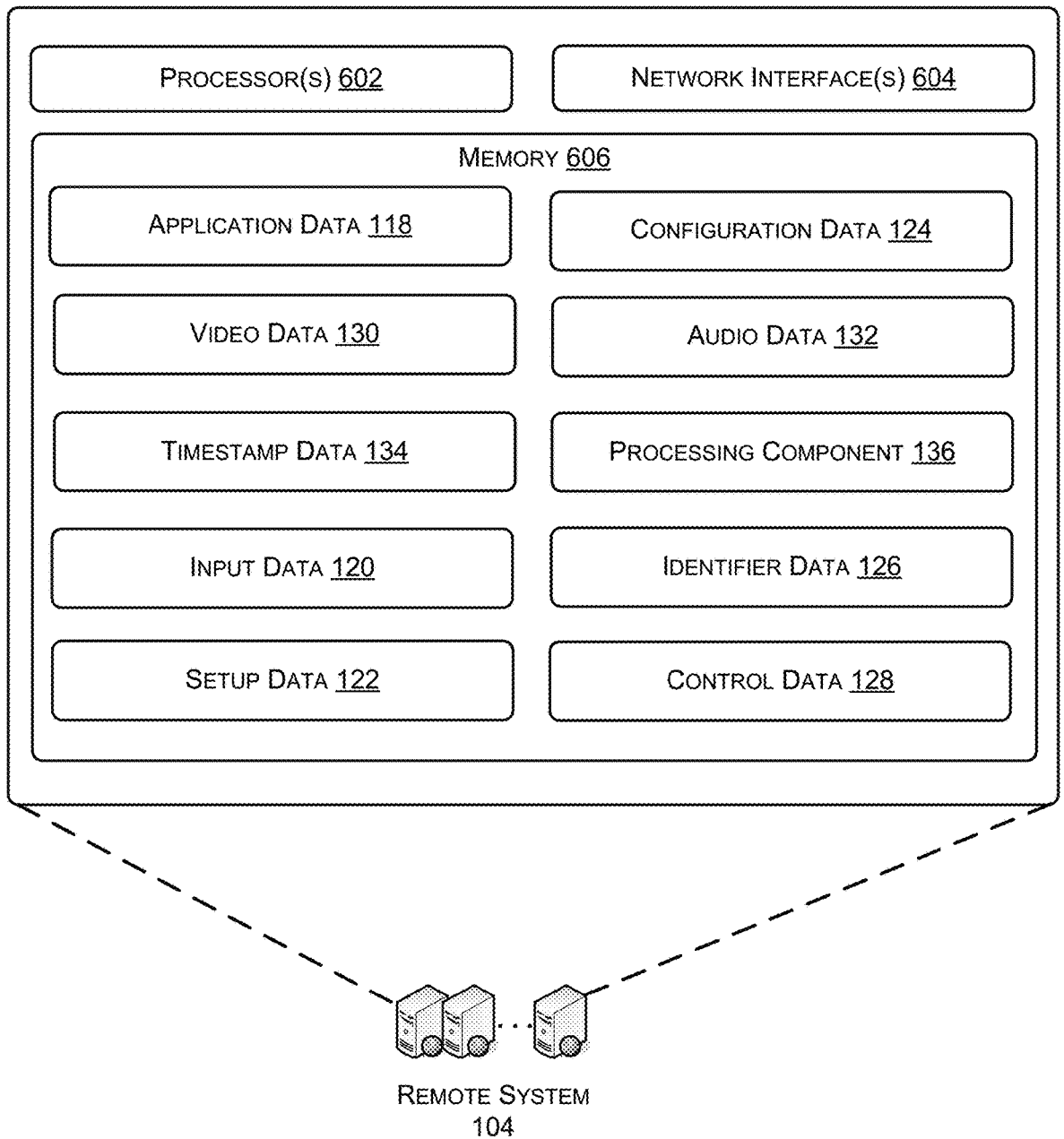
FIG. 6 illustrates a block diagram of an example architecture of a remote system, according to various aspects of the present disclosure.

FIG. 6 illustrates a block diagram of an example architecture of the remote system 104 that is configured to communicate with the electronic device 102, the control device 106, and the display device 108. As shown, the remote system 104 may include processor(s) 602, network interface(s) 604, and memory 606.

As further illustrated in FIG. 6, the remote system 104 may store the configuration data 124. In some instances, the remote system 104 may use the configuration data 124 to perform similar processes as the electronic device 102 described herein. For instance, the remote system 124 may receive, from the electronic device 102 and/or the control device 106, input data representing input(s) received by the control device 106. The remote system 104 may then analyze the input data 120, using the configuration data 124, to determine control(s) being selected by the user 116. The remote system 104 may then use the determined control(s) to update the state of the network application.

Figure 7:
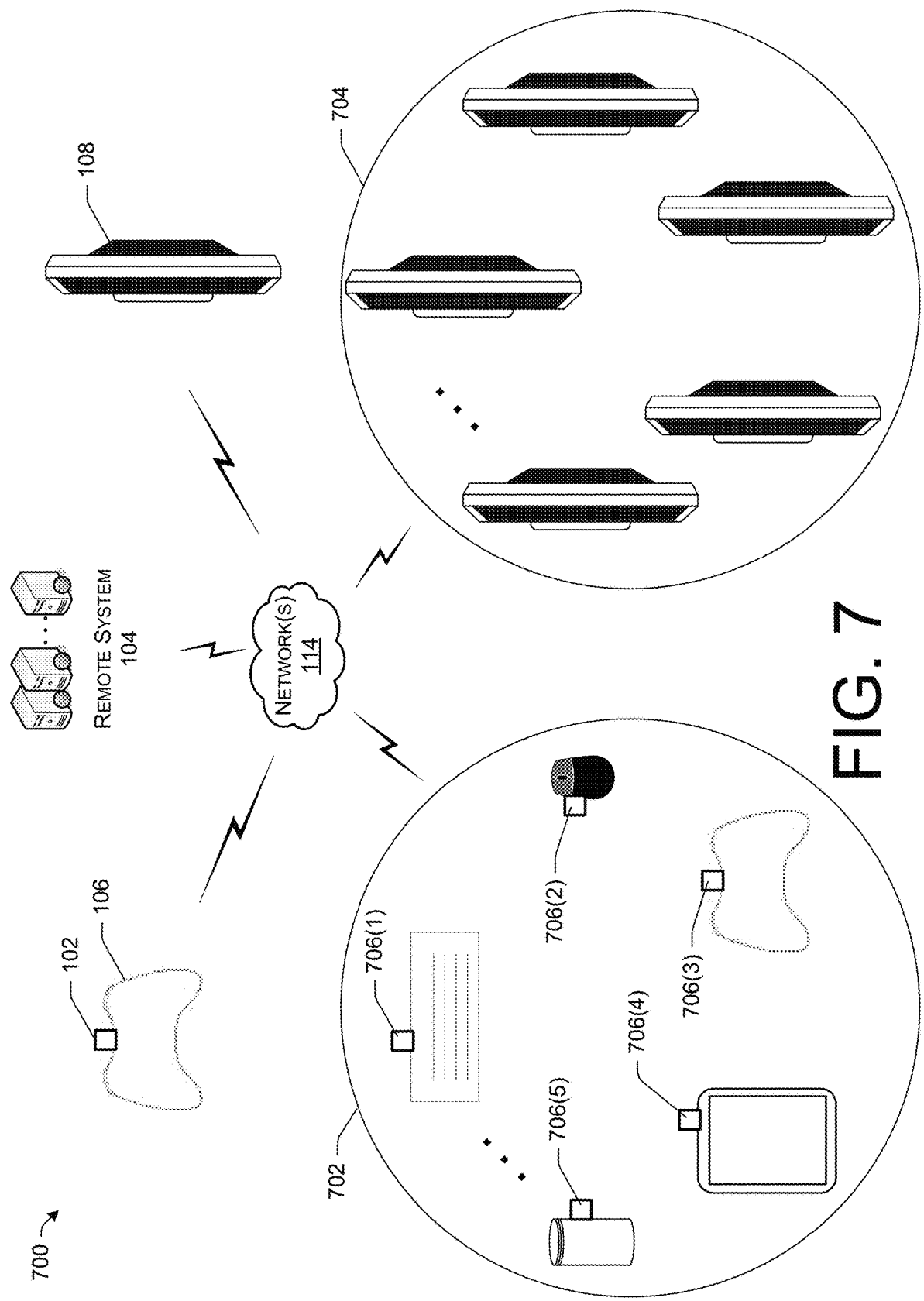
FIG. 7 illustrates a schematic diagram of an example system for communicating with multiple electronic devices and display devices in a network, according to various aspects of the present disclosure.

FIG. 7 illustrates a schematic diagram of an example system 700 for communicating with multiple controlling devices and display devices in a network. The system 700 may include, for example, the electronic device 102, the remote system 104, the control device 106, the display device 108, one or more additional control devices 702, one or more additional display devices 704, and/or one or more additional electronic devices 706(1)-(5) (also referred to as "electronic device 706" and/or "electronic devices 706"). In some instances, and as illustrated in the example of FIG. 7, the one or more additional control devices 702 may be connected to one or more additional electronic device that are similar to the electronic device 102. In some instances, one or more of the additional control devices 702 may not be connected to an additional electronic device.

In the example of FIG. 7, the remote system 104 may receive, over the network(s) 114, control data 128 from the electronic device 102. The remote system 104 may then update, using the control data 128, a local state of an application that is associated with the control device 106. Additionally, the remote system 104 may send, to the display device 108 and over the network(s) 114, video data 130, audio data 132, and/or timestamp data 134 that represents the local state of the network application associated with the control device 106. Furthermore, the remote system 104 may send, over the network(s) 114 and to the one or more display devices 704, data representing the current local state of the network application associated with the control device 106.

The remote system 104 may also perform similar processes for each of the other one or more other control devices 702. For example, the remote system 104 may receive, over the network(s) 114, control data 128 from an electronic device 706 associated with a control device 702. The remote system 104 may then update, using the control data 128, a local state of an application that is associated with the control device 702. Additionally, the remote system 104 may send, to a display device 704 (associated with the control device 702) and over the network(s) 114, video data 130, audio data 132, and/or timestamp data 134 that represents the local state of the network application associated with the control device 702. Furthermore, the remote system 104 may send, over the network(s) 114 and to the display device 108 and/or one or more other display devices 704, data representing the current local state of the network application associated with the control device 702.

In some instances, such as when the network application includes a gaming application, the remote system 104 may store an authoritative version of the environment of the game. The remote system 104 may then use the control data 128 from the control devices to update the positions of objects (e.g., characters, vehicles, buildings, etc.) within the environment. As such, the data representing a local state of the network application that is associated with a control device, such as the control device 106, may represent the position(s) of object(s) that are controlled by the control device. The remote system 104 sends this data to the display device 108 and/or the one or more display device 704 such that the display device 108 and/or the one or more display devices 704 can update the position(s) of the object(s).

For example, a first local state of the network application associated with the control device 106 may be different than a second local state of the network application associated with the control device 702. For example, such as during a multiplayer network game, first local state of the network application associated with the control device 106 may represent a first position of a first object within a gaming environment, where the control device 106 is configured to control the first object. As such, the display device 108 may be displaying image(s) that represent the first local state of the network application. Additionally, the second local state of the network application associated with the control device 702 may represent a second position of a second object within the gaming environment, where the control device 702 is configured to control the second object. As such, the display device 704 (associated with the control device 702) may be displaying image(s) that represent the second local state of the network application.

In such instances, when the remote system 104 updates the second local state of the network application associated with the control device 702, such as by changing the position of the second object within the gaming environment, the remote system 104 may further update the first local state of the network application to include the updated position of the second object. As such, the first local state of the network application may represent both the first position of the first object and the updated position of the second object.

Although the above examples include network applications with multiple users, in other instances, the control device 106 may be associated with both the display device 108 and one or more of the display devices 704. For example, as the remote system 104 is receiving the control data 128 from the electronic device 102 and updating the state of a network application using the control data 128, the remote system 104 may be sending, over the network(s) 114, data (e.g., video data 130, audio data 132, timestamp data 134, etc.) to the display device 108 and a second display device 704. In some instances, the data sent to the display device 108 may be the same as the data that is sent to the second display device 704. For example, the display device 108 and the second display device 704 may be displaying similar content (e.g., image(s) representing a state of the network application). Additionally, the display device 108 and the second display device 704 may be receiving similar timestamp data 134 that causes the display device 108 and the second display device 704 to synchronize displaying of the content.

In some instances, the data sent to the display device 108 may be different than the data that is sent to the second display device 704. For example, the display device 108 and the second display device 704 may operate as a "split-screen" where the display device 108 displays a first portion of the content and the second display device 704 displays a second portion of the content. Additionally, the display device 108 and the second display device 704 may be receiving similar timestamp data 134 that causes the display device 108 and the second display device 704 to synchronize displaying of the content.

In some instances, the control device 106 and one or more other control devices 702 may be associated with the display device 108. For example, a first user may be using the control device 106 to control the network application while a second user is using a second control device 702 to control the network application. For instance, the remote system 104 may be receiving, over the network(s) 114, data (e.g., control data 128) from each of the electronic device 102 associated with the control device 106 and an electronic device 706 associated with the second control device 702. The remote system 104 may then update the state of the network application using the data that is received from each electronic device. Additionally, the remote system 104 may be sending, over the network(s) 114, data (e.g., video data 130, audio data 132, timestamp data 134, etc.) to the display device 108 that represents the current state of the network application.

In some instances, and in each of the examples described above, the control device 106 and one or more of the control devices 702 may be located in the same environment and/or the display device 108 and/or one or more of the display devices 704 may be located in the same environment. In some instances, and in each of the examples described above, the control device 106 and one or more of the control devices 702 may be located in separate environments and/or the display device 108 and/or one or more of the display devices 704 may be located in separate environments.

In the example of FIG. 7, the one or more control devices 702 and/or the one or more display devices 704 may respectively be similar to the control device 106 and/or the display device 108. In other examples, one or more of the control devices 702 and/or one or more of the display devices 704 may respectively be different than the control device 106 and/or the display device 108. For example, one or more of the control devices 702 may correspond to a video game console that processes inputs from a user. After processing the inputs, the video game console may send data to the remote system 104, where the data represents changes the local state of the network application.

In the example of FIG. 7, the electronic devices may send and receive data with one another. For example, the electronic device 102 may receive control data 128 from a second electronic device 702 associated with a second control device 702. In some instances, the electronic device 102 may further receive, from the second electronic device 702, timestamp data 134 indicating a time at which the second control device 702 received the input associated with the control data 128, a time at which the second electronic device 702 received input data 120 from the second control device 702, and/or a time at which the second electronic device 702 sent the control data 128. The electronic device 102 may then send, over the network(s) 114, the received control data 128 and/or timestamp data 134 to the remote system 104. In some instances, the remote system 104 may further receive, over the network(s) 114, the same control data 128 and/or timestamp data 134 from the second electronic device 702.

In some instances, by having the electronic devices communicate with one another by sending the data, and by having the electronic devices send the data to the remote system 104, the remote system 104 may better synchronize the controlling of the network application. For a first example, by receiving the same control data 128 and/or timestamp data 134 from more than one electronic device, the remote system 104 may still receive the control data 128 and/or the timestamp data 134 even if one of the electronic devices has network problems and cannot send the data. For a second example, and since each electronic device may be sending the control data 128 and/or timestamp data 134 being output by all of the electronic devices, the remote system 104 may be able to better process the control data 128 in the order at which the control data 128 was generated.

In examples where the electronic devices communicate with one another, the electronic devices may use a different type of network connection to communicate with one another. For example, the electronic devices may use a short-range network connection, such as Bluetooth, to communicate with one another, while using a long-range network connection, such as the Internet, to communicate with the remote system 104.

Figure 8A:
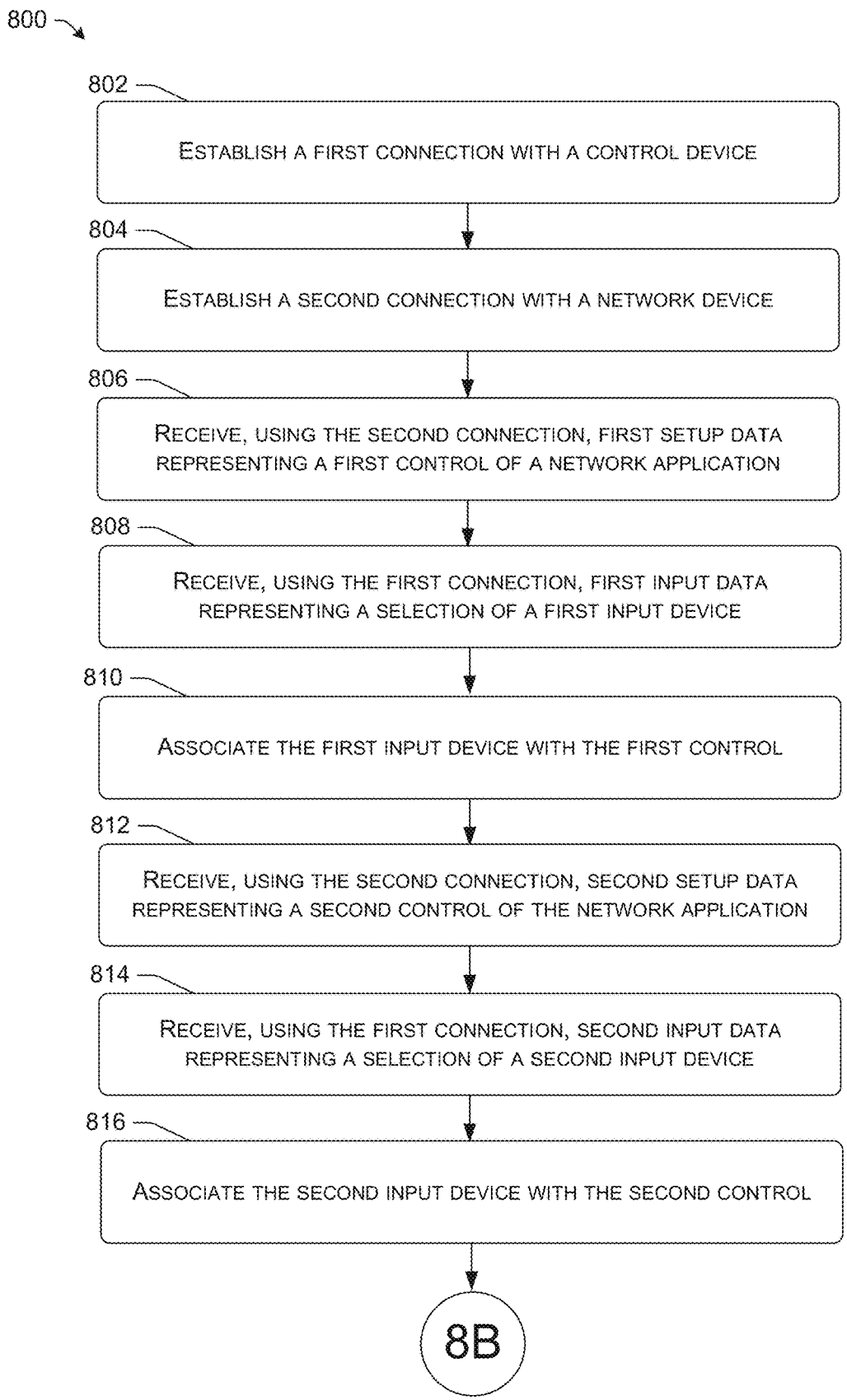
FIGS. 8A-8B illustrate an example process for configuring a control device with a network application, and then using the configuration to control the network application, according to various aspects of the present disclosure.
Figure 8B:
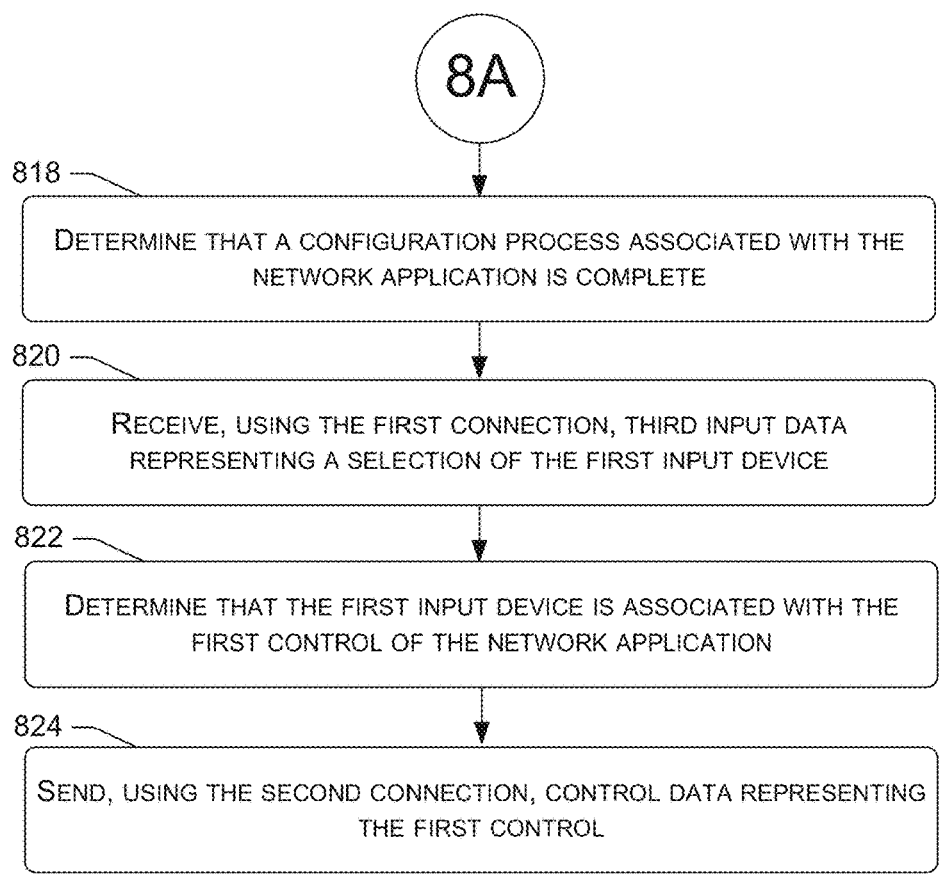
Figure 9:
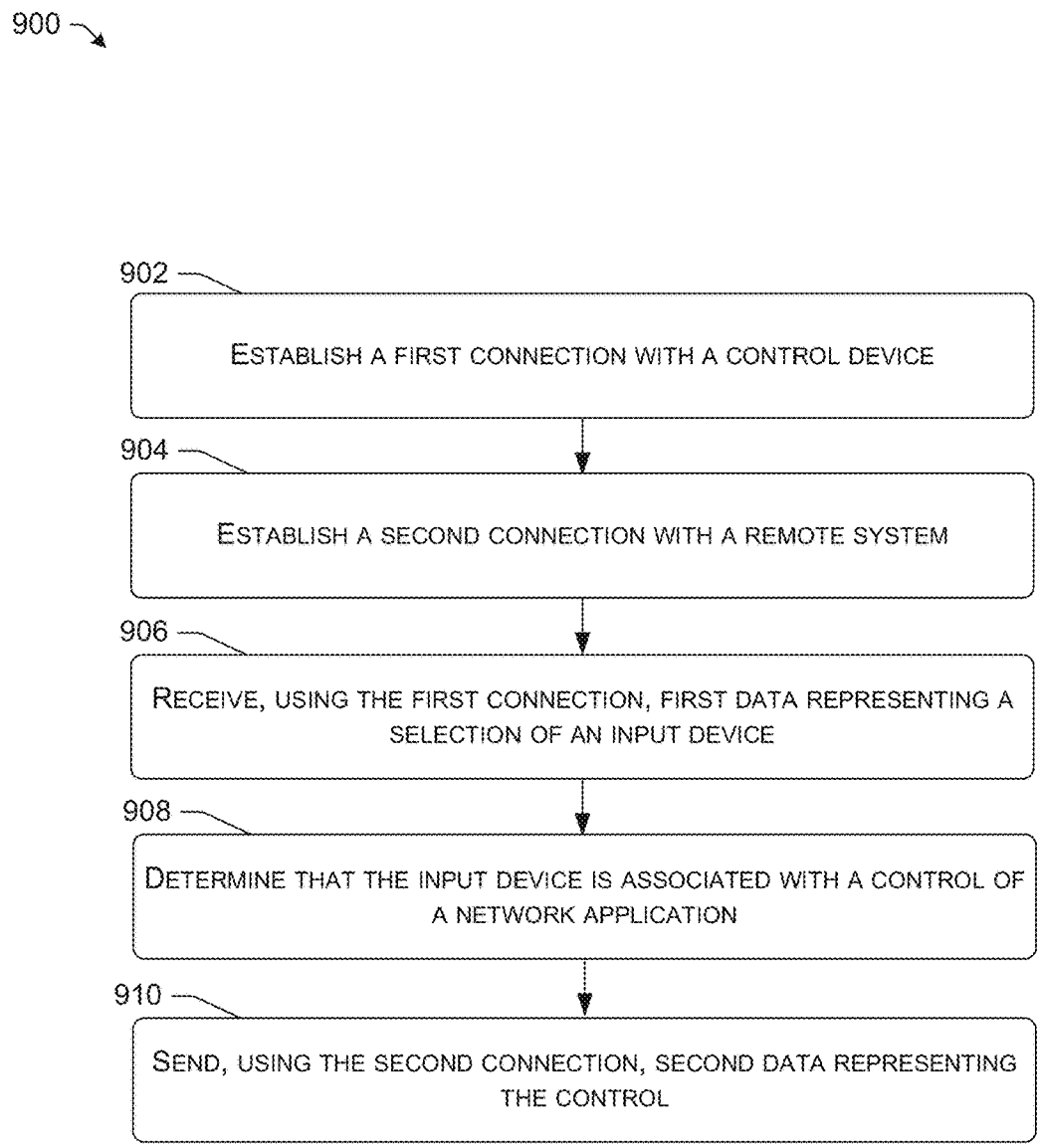
FIG. 9 illustrates an example process for using configuration data to control a network application, according to various aspects of the present disclosure.

FIGS. 8A-9 illustrate various processes for converting inputs from control devices. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

FIGS. 8A-8B illustrate an example process 800 for configuring a control device with a network application, and then using the configuration to control the network application, according to various aspects of the present disclosure. At 802, the process 800 may include establishing a first connection with a control device. For instance, the electronic device 102 may establish the first connection with the control device 106. In some instances, the first connection is a wired connection that the electronic device 102 establishes using a wired connector. In other instances, the first connection includes a wireless connection that the electronic device 102 establishes using a wireless network interface.

At 804, the process 800 may include establishing a second connection with a network device. For instance, the electronic device 102 may establish the second connection with the network device 112. In some instances, the electronic device 102 establishes the second connection using network data associated with the network device 112. In some instances, the electronic device 102 establishes the second connection based at least in part on establishing the first connection with the control device 106.

In some instances, the electronic device 102 may then determine to configure the control device 106 with a network application being executed on the remote system 104. For instance, the electronic device 102 may determine that the electronic device 102 is not storing configuration data associated with the control device 106 and/or the network application. As such, the electronic device 102 may operate in a mode in which the electronic device 102 is able to configure the control device 106 with the network application.

For instance, and at 806, the process 800 may include receiving, using the second connection, first setup data representing a first control of a network application and at 808, the process 800 may include receiving, using the first connection, first input data representing a selection of a first input device. For instance, the electronic device 102 may receive, using the first connection, the first setup data from the remote system 104. Additionally, the electronic device 102 may receive, using the second connection, the first input data from the control device 106. In some instances, the user selects the first input device to associate with the first control.

At 810, the process 800 may include associating the first input device with the first control. For instance, the electronic device 102 may generate configuration data that associates the first input device with the first control. For example, the configuration data may map the first input device to the first control. In some instances, the electronic device 102 then stores the configuration data. Additionally, or alternatively, in some instances, the electronic device 102 sends the configuration data to the remote system 104.

At 812, the process 800 may include receiving, using the second connection, second setup data representing a second control of the network application and at 814, the process 800 may include receiving, using the first connection, second input data representing a selection of a second input device. For instance, the electronic device 102 may receive, using the second connection, the second setup data from the remote system 104. Additionally, the electronic device 102 may receive, using the first connection, the second input data from the control device 106. In some instances, the user selects the second input device to associate with the second control.

At 816, the process 800 may include associating the second input device with the second control. For instance, the electronic device 102 may generate configuration data that associates the second input device with the second control. For example, the configuration data may map the second input device to the second control. In some instances, the electronic device 102 then stores the configuration data. Additionally, or alternatively, in some instances, the electronic device 102 sends the configuration data to the remote system 104. Additionally, in some instances, the electronic device 102 may continue to perform these processes in order to associate additional input devices of the control device 106 with additional controls of the network application.

At 818, the process 800 may include determining that a configuration process associated with the network application is complete. For instance, the electronic device 102 may determine that the configuration is complete. In some instances, the electronic device 102 makes the determination based at least in part on determining that all of the controls have been associated with at least one input device. In some instances, the electronic device 102 makes the determination based at least in part on receiving, from the control device 106, input data indicating that the configuration process is complete. Still, in some instances, the electronic device 102 makes the determination based at least in part on receiving, from the remote system 104, data indicating that the configuration process is complete.

At 820, the process 800 may include receiving, using the first connection, third input data representing a selection of the first input device. For instance, the electronic device 102 may receive, using the first connection, the third input data. The electronic device 102 may receive the third input data while the remote system 104 is executing the network application. For instance, the third input data may be for updating a state of the network application.

At 822, the process 800 may include determining that the first input device is associated with the first control of the network application and at 824, the process 800 may include sending, using the second connection, control data representing the first control. For instance, the electronic device 102 may use the configuration data to determine that the first input device is associated with the first control. The electronic device 102 may then generate the control data representing the first control. Additionally, the electronic device 102 may send, using the second connection, the control data to the remote system 104.

FIG. 9 illustrates an example process 900 for using configuration data to control a network application, according to various aspects of the present disclosure. At 902, the process 900 may include establishing a first connection with a control device. For instance, the electronic device 102 may establish the first connection with the control device 106. In some instances, the first connection is a wired connection that the electronic device 102 establishes using a wired connector. In other instances, the first connection includes a wireless connection that the electronic device 102 establishes using a wireless network interface.

At 904, the process 900 may include establishing a second connection with a network device. For instance, the electronic device 102 may establish the second connection with the network device 112. In some instances, the electronic device 102 establishes the second connection using network data associated with the network device 112. In some instances, the electronic device 102 establishes the second connection based at least in part on establishing the first connection with the control device 106.

In some instances, the electronic device 102 may then receive identifier data associated with the control device 106. The electronic device 102 may then use the identifier data to identify that the first connection is with the control device 106. Additionally, in some instances, the electronic device 102 may receive data identifying a network application. The electronic device 102 may then determine if the electronic device 102 is storing configuration data associated with the control device 106 controlling the network application. Additionally, or alternatively, in some instances, the electronic device 102 may receive the configuration data, such as from the remote system 104.

At 906, the process 900 may include receiving, using the first connection, first data representing a selection of an input device. For instance, the electronic device 102 may receive, using the first connection, the input data. The electronic device 102 may receive the input data while the remote system 104 is executing the network application. For instance, the third input data may be for updating a state of the network application.

At 908, the process 900 may include determining that the input device is associated with a control of a network application and at 910, the process 900 may include sending, using the second connection, second data representing the control. For instance, the electronic device 102 may use the configuration data to determine that the input device is associated with the control. The electronic device 102 may then generate the second data representing the control. Additionally, the electronic device 102 may send, using the second connection, the second data to the remote system 104.

While the foregoing invention is described with respect to the specific examples, it is to be understood that the scope of the invention is not limited to these specific examples.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the network application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. An electronic device comprising:
a wired connector configured to establish a wired connection with a first gaming controller, the first gaming controller being of a first platform type;
one or more network interfaces;
one or more processors; and
one or more computer-readable media storing instructions that, when executed by the one or more processors, cause the one or more processors to perform operations comprising:
establishing, using the one or more network interfaces, a wireless connection with an access point;
receiving, using the one or more network interfaces and over the wireless connection, first setup data representing a first control associated with a second gaming controller, the second gaming controller being of a second platform type;
receiving, using the wired connector and over the wired connection, first input data from the first gaming controller;
determining that the first input data represents a first selection of a first input device of the first gaming controller;
based at least in part on the first selection of the first input device, generating first configuration data that associates the first input device the first control of the second gaming controller;
receiving, using the one or more network interfaces and over the wireless connection, second setup data from the access point, the second setup data representing a second control associated with the second gaming controller;
receiving, using the wired connector and over the wired connection, second input data from the first gaming controller;
determining that the second input data represents a selection of a second input device of the first gaming controller;
based at least in part on the selection of the second input device, generating second configuration data that associates the second input device with the second control of the second gaming controller;
determining that a configuration process associated with the first gaming controller is complete;
after determining the configuration process is complete, receiving, using the wired connector and over the wired connection, third input data representing a second selection of the first input device;
causing the electronic device to transition to a first mode of operation prior to receiving the third input data, wherein one or more components of the electronic device are activated;
determining, based at least in part on the first configuration data, that the first input device is associated with the first control of the second gaming controller;
determining control data based at least in part on the first configuration data and the third input data;
sending, using the one or more network interfaces and over the wireless connection, a low-latency transmission comprising control data representing an indication that the first control was selected; and
operating the electronic device in a second mode of operation wherein the one or more components of the electronic device are deactivated after conveying the low-latency transmission and in response to the electronic device not receiving input data from the first gaming controller for at least a threshold period of time.

2. The electronic device as recited in claim 1, the operations further comprising:
storing the first configuration data in association with an identifier of the first gaming controller; and
storing the second configuration data in association with the identifier of the first gaming controller.

3. The electronic device as recited in claim 2, wherein the wired connection is a first wired connection, and wherein the operations further comprise:
determining, using the wired connector, that a second wired connection has been established with the first gaming controller;
receiving, using the wired connector and over the second wired connection, identifier data representing the identifier of the first gaming controller; and
determining, using the identifier data, that the first gaming controller is associated with at least the first configuration data.

4. A method comprising:
establishing, by an electronic device and using a first network interface, a first connection with a first control device, the first control device being a first platform type;
establishing, by the electronic device and using a second network interface, a wireless connection with one or more computing devices;
receiving, by the electronic device and using the wireless connection, first data representing a control of a second control device, the second control device being a second platform type;
receiving, by the electronic device and using the first connection, second data from the first control device;
determining that the second data represents a selection of an input device of the first control device;
generating, based at least in part on the selection of the input device, configuration data that associates the input device of the first platform type with the control of the second control device having the second platform type;
receiving input data from the first control device;
causing the electronic device to transition to a first mode of operation prior to receiving the input data from the first control device, wherein one or more components of the electronic device are activated;
determining control data based at least in part on the configuration data and the input data;
conveying, by the electronic device and using the wireless connection, a low-latency transmission comprising the control data to the one or more computing devices; and
operating the electronic device in a second mode of operation after conveying the low-latency transmission, wherein in the second mode of operation the one or more components operate are deactivated.

5. The method as recited in claim 4, further comprising:
receiving identifier data associated with the first control device; and
associating the configuration data with the identifier data.

6. The method as recited in claim 4, further comprising:
determining that the first control device has not been configured for a network application, and
wherein generating the configuration data is based at least in part on determining that the first control device has not been configured.

7. The method as recited in claim 4, further comprising:
storing the configuration data that associates the input device with the control;
after storing the configuration data, receiving, using the first connection, identifier data associated with the first control device; and
identifying the configuration data based at least in part on the identifier data.

8. The method as recited in claim 4, wherein the input device is a first input device and the configuration data is first configuration data, and wherein the method further comprises:
establishing, using the first network interface, a third connection with a third control device, wherein the third control device is a third type;
receiving, using the third connection, third data from the third control device;
determining that the third data represents a selection of a second input device of the third control device; and
generating second configuration data that associates the second input device with the control of the second control device.

9. The method as recited in claim 4, wherein the selection is a first selection and the configuration data is first configuration data, and wherein the method further comprises:
receiving, using the first connection, third data from the first control device;
determining that the third data represents a second selection of the input device; and
generating second configuration data that associates the input device with a control of a third control device.

10. The method as recited in claim 4, further comprising:
receiving, using the wireless connection, audio data from the one or more computing devices, the audio data representing a state of a network application; and
sending, using the first connection, the audio data to the first control device.

11. The method as recited in claim 4, wherein the selection is a first selection, and wherein the method further comprises:
receiving, using the first connection, third data from the first control device;
determining that the third data represents a second selection of the input device of the first control device;
determining, based at least in part on the configuration data, that the input device is associated with the control; and
sending, using the wireless connection, fourth data to the one or more computing devices, the fourth data representing an indication that the control was selected.

12. The method as recited in claim 11, further comprising at least one of:
sending, using the wireless connection, fifth data to the one or more computing devices, the fifth data representing a timestamp indicating when the first control device received the second selection; or
sending, using the wireless connection, sixth data to the one or more computing devices, the sixth data representing an identifier associated with at least one of the first control device or the electronic device.

13. The method as recited in claim 4, wherein:
the first platform type is associated with a first gaming system; and
the second platform type is associated with a second gaming system that is different than the first gaming system.

14. The method as recited in claim 4, wherein:
the first platform type is compatible for a network application; and
the second platform type is incompatible for the network application.

15. An electronic device comprising:
a first network interface;
a second network interface;
one or more processors; and
one or more computer-readable media storing instructions that, when executed by the one or more processors, cause the one or more processors to perform operations comprising:
establishing, using the first network interface, a first connection with a gaming controller, the gaming controller being associated with a first gaming platform type;
establishing, using the second network interface, a second connection with one or more computing devices;
receiving, using the second connection, first data representing a control associated with a gaming application, the gaming application being associated with a second gaming platform type that is different than the first gaming platform type;
receiving, using the first connection and from the gaming controller, second data representing a selection of an input device of the gaming controller;
based at least in part on receiving the second data, generating configuration data that associates the input device of the gaming controller with the control associated with the gaming application
receiving input data from the gaming controller;
causing the electronic device to transition to a first mode of operation prior to receiving the input data from the gaming controller, wherein one or more components of the electronic device are activated;
determining control data based at least in part on the configuration data and the input data;
conveying, by the electronic device and using the second network interface connection, a low-latency transmission comprising the control data to the one or more computing devices; and
operating the electronic device in a second mode of operation after conveying the low-latency transmission, wherein in the second mode of operation the one or more components are deactivated.

16. The electronic device as recited in claim 15, wherein the selection is a first selection, and wherein the operations further comprise:
receiving, using the first connection, third data representing a second selection of the input device;
determining, based at least in part on the configuration data, that the input device is associated with the control; and sending, using the second connection, fourth data to the one or more computing devices, the fourth data representing an indication that the control was selected.

17. The electronic device as recited in claim 15, the operations further comprising storing third data that associates the configuration data with identifier data, the identifier data associated with the gaming controller.

18. The electronic device as recited in claim 15,
wherein the gaming controller is a first gaming controller, and wherein the operations further comprise:
establishing, using the first network interface, a third connection with a second gaming controller;
establishing, using the second network interface, a fourth connection with the one or more computing devices;
receiving, using the fourth connection, third data representing the control associated with the gaming application;

receiving, using the third connection, fourth data representing a selection of an input device of the second gaming controller; and
generating second configuration data that associates the input device of the second gaming controller with the control associated with the gaming application.

19. The electronic device as recited in claim 15, wherein:
the gaming controller is a first gaming controller that is the first platform type;
the first gaming system is associated with one or more first gaming applications; and
the second gaming system is associated with:
a second gaming controller that is associated with the second platform type; and
one or more second gaming applications, the one or more second gaming applications including at least the gaming application.

* * * * *